United States Patent [19]
Petersen, Jr.

[11] 3,872,618
[45] Mar. 25, 1975

[54] APPARATUS AND METHOD FOR RETRIEVING A FISH HOOK

[76] Inventor: Harry Petersen, Jr., Waterloo, Iowa

[22] Filed: May 6, 1974

[21] Appl. No.: 467,381

[52] U.S. Cl. .............................................. 43/53.5
[51] Int. Cl. .......................................... A01k 97/00
[58] Field of Search ....... 43/53.5; 15/211, 213, 193, 15/204

[56] References Cited
UNITED STATES PATENTS
2,567,923  9/1951  Burke .................................. 15/211

Primary Examiner—Louis G. Mancene
Assistant Examiner—Peter K. Skiff
Attorney, Agent, or Firm—Morton S. Adler

[57] ABSTRACT

A wad or mass of netting material is secured to one end of an elongated staff support to form a swab-like appendage thereon and is manually inserted into the gullet of a fish to retrieve a barbed fish hook embedded therein. The netting is designed to enmesh or snare one of the barbed ends of a multibarbed pronged fish hook and by manipulation rotates the hook out of engagement with the flesh of the fish and into its gullet whereby it can be easily and simply withdrawn.

7 Claims, 8 Drawing Figures

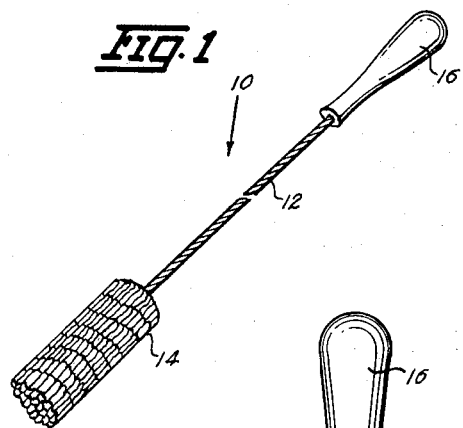
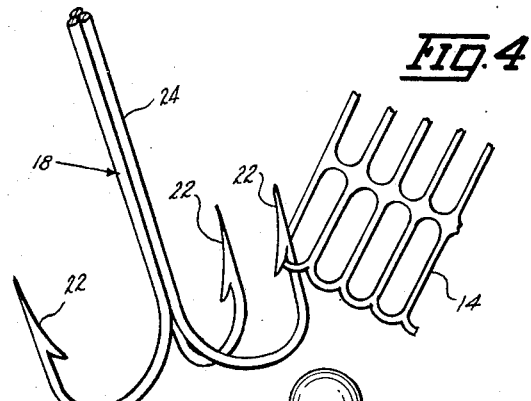
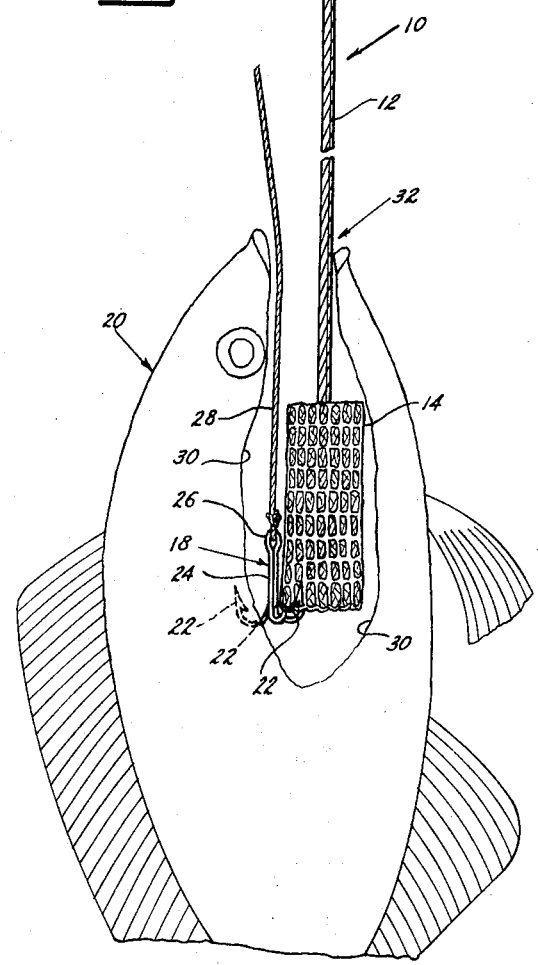
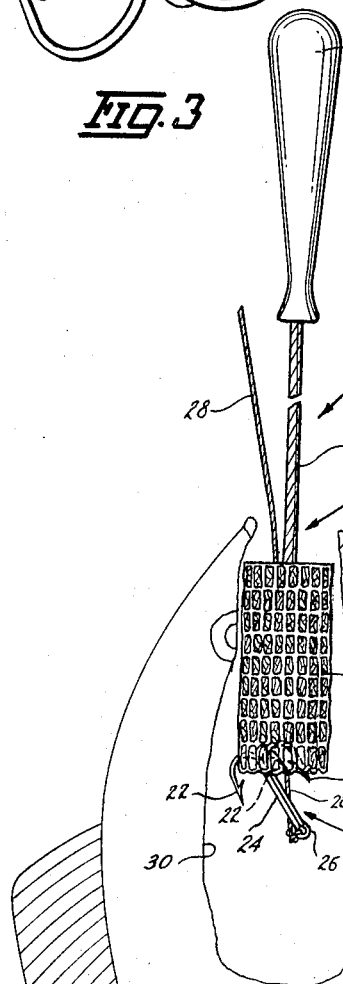

PATENTED MAR 25 1975 3,872,618
SHEET 2 OF 2
Fig. 5
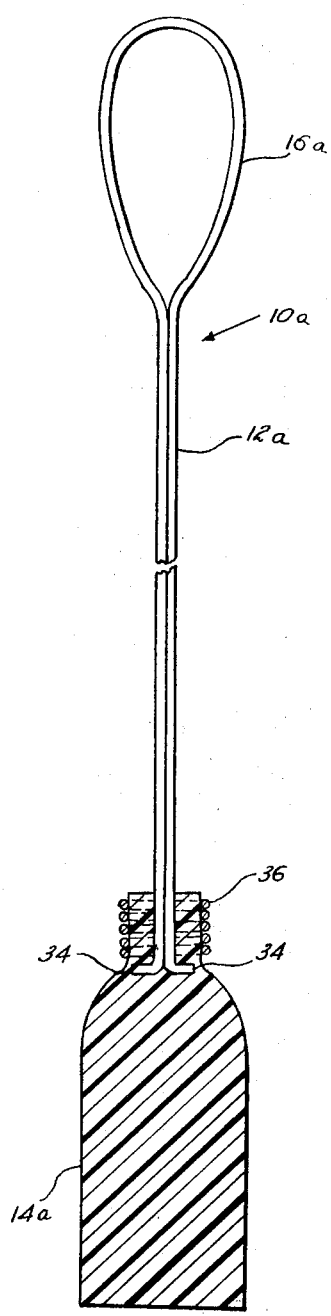
Fig. 7
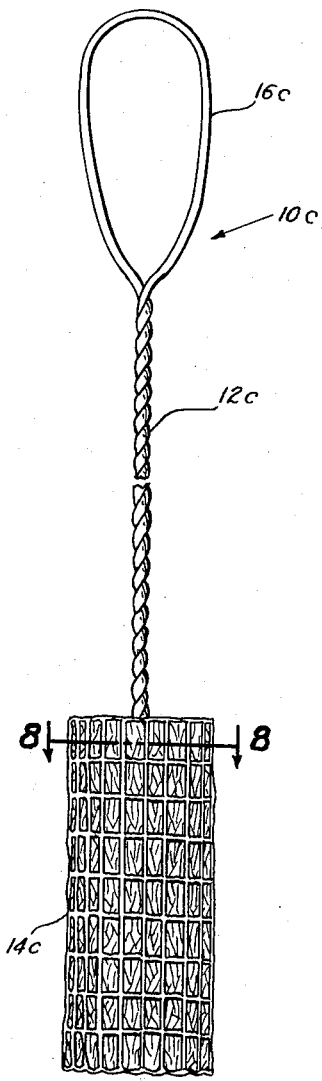
Fig. 6
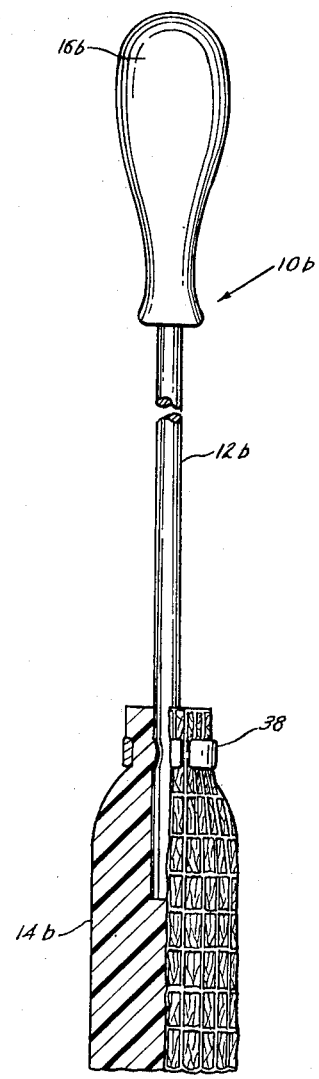
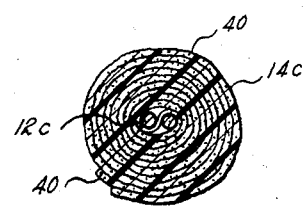
Fig. 8

APPARATUS AND METHOD FOR RETRIEVING A FISH HOOK

BACKGROUND OF THE INVENTION

This invention relates to improvements in an apparatus and method to simplify and expedite the removal of a pronged fish hook from the innards of a fish and is more particularly designed for retrieving what is known as the treble hook.

Fish hooks, as are well known, generally have barbed points or prongs and when used with artificial lures particularly, are frequently formed in multiples such as the treble hook so that the difficulties than can be encountered at times in their removal from the fish and the possibility of injury to the fisherman are well known to any fishing enthusiast.

Prior endeavors to faciliate the removal of a single pronged fish hook are exemplied in U.S. Pat. Nos. 2,618,881 and 2,823,486 and as disclosed in my copending application for a Retrievable Fish Hook, Ser. No. 432,574, filed Jan. 11, 1974 but the treble hook and also the double hook, present additional problems for which the present invention is a new approach so far as I am aware.

It has been observed in removing treble hooks from a fish that generally at least one of the barbed prongs is exposed to some extent within the gullet so that one of the important objects of the present invention is to employ an improved method of grasping or snaring the exposed barbed end and applying a sufficient pulling force thereto to rotate the entire hook and effectively remove it from engagement with the flesh of the fish so that it may be easily withdrawn.

A further object herein is to provide a convenient apparatus or tool for employing the above method wherein the barbed prong engaging portion is a swab-like netting type appendage on one end of an elongated shaft or staff and permits the hook to be retrieved without the necessity of the fisherman's fingers being extended into the fish or into contact with the hook.

Still another object in an apparatus of the above class is to provide an appendage capable of being pierced by or entwined or enmeshed upon the barbed prong for which a netting type of material made of either synthetic or natural substances may be suitably employed.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of my fish hook retrieving apparatus or tool,

FIG. 2 is an enlarged elevational view of this apparatus shown inserted into the gullet of a fish for initially snaring one of the barbed prongs of a treble hook engaged therein, FIG. 3 is a view similar to FIG. 2 but showing the apparatus in a position of withdrawal after having enmeshed or snared the hook and removed it from engagement with the flesh of the fish, FIG. 4 is an enlarged fragmentary perspective view of the snaring or enmeshing relationship of this apparatus with the treble hook, FIGS. 5, 6 and 7 are respective like elevational views to illustrate varied embodiments in the form of staff and handle arrangements and the attachment of the swab-like mass thereto, and FIG. 8 is a sectional view taken on the line 8—8 of FIG. 7.

DESCRIPTION OF THE PREFERRED EMBODIMENTS

Referring to the drawings, my new fish hook retrieving apparatus is designated generally by the numeral 10 as seen in FIG. 1 and includes a staff or shaft 12 to one end of which is arranged a swab-like appendage 14 and on the other end carries a suitable handle 16. The particular form and style or shaft 12 and handle, as will appear, is a matter of choice and it is sufficient if staff 12 is elongated and relatively rigid with handle 16 being suitable for conveniently holding apparatus 10. For this purpose, staff or shaft 12 as seen in FIG. 1 is of twisted wire and handle 16 may be of wood, plastic or the like.

The more important feature of apparatus or tool 10 is the appendage 14 for which I have preferably used plastic or nylon netting rolled, bunched or otherwised suitably formed into a flexible swab-like mass and secured to one end of shaft 12 as shown so that it can be used in retrieving a fish hook 18 from a fish 20 as will become apparent.

Hook 18 is of a well known type having the upwardly curved and generally equally spaced three barbed points or prongs 22 attached to a common shank 24 which includes an eye 26 by which it is secured to a fishing line 28 or, as is well known, to an artificial lure (not shown). When the hook 18 is taken or swallowed by fish 20, one or more of the barbed points 22 will become engaged in the flesh of the fish as seen in the broken line prong 22 in FIG. 2, but experience has shown that generally at least one of the barbed ends 22 will be exposed within the gullet 30 as shown by the solid line representation of one of such ends or points 22 in FIG. 2. Accordingly, for removing hook 18 from its engaged position shown in FIG. 2, a person by grasping the handle 16, inserts the appendage 14 through the mouth 32 of the fish 20 into the gullet 30 until it snares or enmeshes the exposed barbed prong 22 and once this has been accomplished, a pulling force applied to apparatus 10 will effectively loosen and remove the flesh engaged barbed points 22 by rotating or reversing the position of hook 18 within the gullet 30 as shown in FIG. 3. In this position, the barbed points 22 are oriented away from the mouth 32 of the fish 20 so that the snared or enmeshed hook 18 can easily be withdrawn and retrieved without requiring the fisherman to extend his hand or fingers either into the fish or into contact with the hook 18.

In carrying out the above described method of retrieving hook 18, it will be appreciated that appendage 14 should be of sufficiently sturdy material so as to resist tearing or ripping to the extent that the hold on the barbed prong 22 will not be lost and I have found that plastic or nylon netting material is adequately suitable for this purpose. However, it is not intended that appendage 14 be limited to such materials since any suitable swab or mass of woven material or otherwise capable of being pierced by or enmeshed upon the barbed prong 22 to hold the same for the purpose intended may be employed for the method described. Likewise, it is pointed out that while this apparatus 10 is most efficient in retrieving the treble pronged hook, it is not necessarily limited thereto.

The illustrations in FIGS. 5, 6 and 7, designated respectively 10a, 10b and 10c, are provided to show various embodiments of the staff and handle components of apparatus 10 for which corresponding parts to those previously described are given corresponding numerals with the respective letters indicated. Thus, for example, staff 12a and handle 16a in FIG. 5 are formed from a single length of wire material bent as shown to form the loop handle 16a and the parallel portions forming staff 12a with the lower ends of staff 12a being provided with the two oppositely extending hooks 34 adapted to be hookedly engaged in one end of the appendage 14a and further secured thereto by suitable wrappings of wire, cord or the like 36. In FIG. 6, staff 12b is shown in the form of a solid rod to which appendage 14b is secured by a circumscribing clip 38 and handle 16b is similar to handle 16. In FIG. 7, staff 12c and handle 16c are similar to FIG. 5 except that the wire lengths for staff 12c are twisted together and appendage 14c is attached thereto by any suitable bonding agent 40 illustrated in FIG. 8. Other forms and types of staffs and handles will, of course, be readily apparent and, as indicated previously, are merely a matter of choice. Accordingly, in view of the foregoing, it is thought a full understanding of the method of retrieving a fish hook from a fish and the apparatus to employ such method will be had and the advantages of the same will be appreciated.

I claim:

1. Apparatus for retrieving a fish hook from the innards of a fish comprising:

an elongated relatively rigid staff, and a swab-like appendage secured at one point thereon to one end portion of said staff so that substantially the entire appendage projects beyond said shaft.

2. Apparatus as defined in claim 1 including said appendage being a body of flexible material rolled, bunched or otherwise formed into a swab-like mass capable of snaring, enmeshing, or being pierced by a barbed prong of a fish hook so as to retain a hold thereon.

3. Apparatus as defined in claim 1 including said appendage being a bunched mass of netting material.

4. Apparatus as defined in claim 3 including said netting material being of plastic.

5. Apparatus as defined in claim 3 including said netting material being of nylon.

6. A method of retrieving a nulti-barbed pronged fish hook embedded within the innards of a fish, comprising the steps of:

forming a mass of flexible material into a wad capable of snaring and retaining a hold on a barbed prong of a fish hook, inserting the wad into the gullet of the fish into snaring or enmeshing engagement with one of the barbed prongs on the fish hook, imposing a pulling force on the wad to reverse the position of the hook and loosen it from engagement with the flesh of the fish, and withdrawing the wad from the gullet with the snared hook.

7. A method as defined in claim 6 including securely affixing the wad to a suitable hand gripping member.

* * * * *